United States Patent
Laakso, Jr. et al.

(10) Patent No.: US 7,741,409 B2
(45) Date of Patent: *Jun. 22, 2010

(54) CURE SYSTEM COMPOSITION AND A METHOD FOR CURING CHLORINATED ELASTOMER COMPOSITIONS

(75) Inventors: Raymond L. Laakso, Jr., St. Francisville, LA (US); Gary R. Marchand, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/817,238

(22) PCT Filed: Feb. 22, 2006

(86) PCT No.: PCT/US2006/006028

§ 371 (c)(1),
(2), (4) Date: Aug. 28, 2007

(87) PCT Pub. No.: WO2006/098846

PCT Pub. Date: Sep. 21, 2006

(65) Prior Publication Data

US 2008/0153990 A1 Jun. 26, 2008

Related U.S. Application Data

(60) Provisional application No. 60/661,594, filed on Mar. 14, 2005.

(51) Int. Cl.
C08C 19/20 (2006.01)
C08C 19/22 (2006.01)
C08F 8/30 (2006.01)
C08F 8/34 (2006.01)
C08K 5/47 (2006.01)
C08K 5/19 (2006.01)
C08J 3/24 (2006.01)

(52) U.S. Cl. .............. 525/331.1; 525/331.2; 525/330.7; 525/333.9; 525/343; 525/346; 525/349; 525/350

(58) Field of Classification Search .............. 525/330.7, 525/331.1, 331.2, 333.9, 343, 346, 349, 350
See application file for complete search history.

(56) References Cited

U.S. PATENT DOCUMENTS 4,128,510 A 12/1978 Richwine
4,234,705 A 11/1980 Matoba
4,288,576 A 9/1981 Richwine
4,342,851 A 8/1982 Suzui et al.
4,357,446 A 11/1982 Matoba
4,482,681 A 11/1984 Berta et al.
4,745,147 A 5/1988 Honsberg
5,665,830 A 9/1997 Class
5,686,537 A * 11/1997 Class .......................... 525/349

FOREIGN PATENT DOCUMENTS

EP 0 332 729 A1 9/1989
EP 332729 A1 * 9/1989

* cited by examiner

Primary Examiner—Roberto Rábago

(57) ABSTRACT

The instant invention is an improved cure system composition and a method for curing chlorinated elastomer compositions. The cure system composition includes a polymercapto crosslinking agent; an inorganic base; and an onium salt. The onium salt has a formula selected from the group consisting of formula (I) and formula (II); wherein Z is a nitrogen or phosphorous atom, R1 to R4 are independently alkyl or aryl groups containing between 2 and 8 carbon atoms, and the total number of carbon atoms on R1-R4 is between 10 and 14; wherein R5 and R6 are alkyl groups containing between 1 and 8 carbon atoms, and the total number of carbon atoms on R5-R6 being between 5 and 9; and wherein X is an anion. The method for curing a chlorinated elastomer composition according to instant invention includes the following steps: (1) providing a chlorinated elastomer composition; (2) providing a cure system composition as described above; (3) contacting said chlorinated elastomer composition with said cure system composition; and (4) thereby curing said chlorinated elastomer composition.

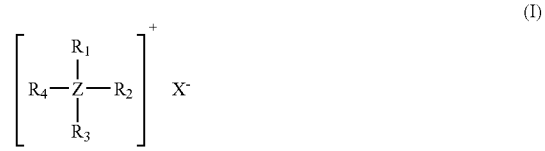

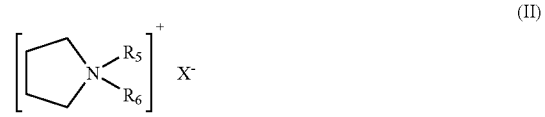

9 Claims, No Drawings

CURE SYSTEM COMPOSITION AND A METHOD FOR CURING CHLORINATED ELASTOMER COMPOSITIONS

This application is claiming priority from U.S. Provisional Application Ser. No. 60/661,594, filed on Mar. 14, 2005 entitled "Vulcanizable Chlorinated Elastomer Compositions with Improved Processing Safety," the teachings of which are incorporated by reference herein as if reproduced in full hereinbelow.

The instant invention relates to an improved cure system composition and a method for curing chlorinated elastomer compositions.

Chlorinated elastomers may be cured by numerous means including the use of peroxide/coagent systems, thiadiazole-based systems, or irradiation crosslinking techniques. Peroxide cures are typically preferred for their scorch safety, shelf-life or bin stability, low permanent set, and high temperature performance. However, peroxide cure systems are often unacceptable for use in molded goods because of mold sticking and fouling due to volatiles or in applications that require a low temperature cure due to equipment or processing limitations.

Thiadiazole-based cure systems provide certain advantages such as the ability to cure over a wider range of temperature and pressure conditions than peroxide cures while generating fewer volatile byproducts, having good mold release characteristics, and the ability to use less expensive compounding ingredients such as aromatic oils.

U.S. Pat. No. 4,128,510 discloses that halogen containing polymers can be crosslinked by employing a cure system including 2,5-dimercapto-1,3,4-thiadiazole (or its derivatives) and a basic material such as a metal oxide, metal hydroxide, or metal carboxylate. It further discloses that the addition of an accelerator containing aliphatic or aromatic amines or quaternary nitrogen groups may be desirable; additionally, the condensation product of butyraldehyde and aniline is described as being a particularly useful accelerator.

U.S. Pat. No. 4,288,576 discloses 2,5-dimercapto-1,3,4-thiadiazole (and derivatives thereof) curing systems for saturated halogen containing elastomers, for example chlorinated polyethylene, wherein the curing systems specifically include certain vulcanization accelerators. Classes of accelerators include: 1) amines having a boiling point above 110° C. and pK values below about 4.5; 2) salts of amines with pK values below 4.5 and acids having pK values above 2.0; 3) quaternary ammonium hydroxides and their salts with acids having a pK above 2.0; 4) diphenyl- and ditolyl-guanidines; and 5) the condensation product of aniline and mono-aldehydes containing one to seven carbon atoms. The presence of at least an equal amount of an inorganic base is additionally required.

Despite the excellent vulcanizate properties obtainable with the polymercapto/inorganic base/accelerator-based vulcanization systems for chlorinated elastomers, two key problems remain that limit their usefulness. The first problem is the premature vulcanization of the compound during storage (that is, poor bin stability) or during processing (that is, poor scorch safety) prior to forming the vulcanized article. The second problem is the inconsistency of the vulcanization rate. It is desired that the elastomer compound, after preparation, be stable under typical environmental conditions of storage and during processing of the compound such that minimal vulcanization occurs prior to formation of the finished article. A consistent vulcanization rate is desired so that processes that form the finished vulcanized article, for example injection molding, extrusion, or compression molding can be run consistently and without the generation of scrap materials.

U.S. Pat. No. 4,745,147 discloses curable compositions of a chlorinated polyethylene, a polymercapto crosslinking agent, an acid acceptor, and a polyhydric alcohol. The composition must also contain a cure initiator such as an amine, a quaternary ammonium salt or a quaternary phosphonium salt (collectively hereinafter referred to as "onium salt"). The onium salts are of either the formula $R_1R_2R_3R_4Z^+Cl^-$ or the chloride salt of an N-substituted pyridinium ion, wherein Z is N or P; $R_1$-$R_4$ may be the same or different from each other and selected from $C_{1-17}$ alkyl, cyclohexyl, phenyl and benzyl groups. The polyhydric alcohol is said to improve the cure state and heat aging of crosslinked compositions.

U.S. Pat. Nos. 5,665,830 and 5,686,537 disclose that variability in the premature curing (scorch) of the 2,5-dimercapto-1,3,4-thiadiazole, amine/quaternary ammonium salt, metal oxide cure system is due to the influence of water and that the variation can be eliminated by addition of polyethylene glycol or glycerin.

U.S. Pat. No. 4,482,681 discloses polymercapto cure systems containing an organic or inorganic base, and a hydrated salt, which releases its water during curing. The hydrated salt improves the cure rate. Some chlorinated elastomers also require an accelerator, which may be an amine or a quaternary ammonium salt.

Despite the research efforts in developing and improving in the scorch safety and cure rate reproducibility, there is still a need for further improvement in scorch safety while maintaining an acceptable cure rate.

The instant invention is an improved cure system composition and a method for curing chlorinated elastomer compositions. The cure system composition includes a polymercapto crosslinking agent, an inorganic base, and an onium salt. The onium salt has a formula selected from the group consisting of

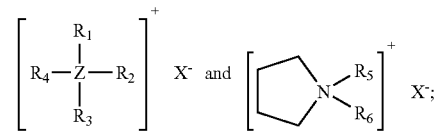

wherein Z is a nitrogen or phosphorous atom, $R_1$ to $R_4$ are independently alkyl or aryl groups containing between 2 and 8 carbon atoms, and the total number of carbon atoms on $R_1$-$R_4$ is between 10 and 14; wherein $R_5$ and $R_6$ are alkyl groups containing between 1 and 8 carbon atoms, and the total number of carbon atoms on $R_5$-$R_6$ being between 5 and 9; and wherein X is an anion. The method for curing a chlorinated elastomer composition according to instant invention includes the following steps: (1) providing a chlorinated elastomer composition; (2) providing a cure system composition as described above; (3) contacting said chlorinated elastomer composition with said cure system composition; and (4) thereby curing said chlorinated elastomer composition.

The cure system composition according to instant invention includes a polymercapto crosslinking agent, an inorganic base, and an onium salt. Additionally, a curable chlorinated elastomer according to instant invention includes a chlorinated elastomer, and a cure system composition including a polymercapto crosslinking agent, an inorganic base, and an onium salt.

Any polymer or copolymer containing chlorine atoms, which can be compounded to form an elastomeric product after crosslinking, can be considered a chlorinated elastomer for the purposes of this invention. Examples of chlorinated elastomers include, but are not limited to, polychloroprene, polyepichlorohydrin, epichlorohydrin/ethylene oxide copolymers, chlorosulfonated polyethylene, chlorinated butyl rubber, and chlorinated polyethylene. Chlorinated and chlorosulfonated polyethylene are especially preferred in the compositions of this invention because such elastomers are more difficult to dehydrochlorinate than the other elastomers listed above; thus, they are more sensitive to differences in accelerator.

Inorganic bases suitable for use in the compositions of this invention include, but are not limited to, metal oxides, metal hydroxides, or their salts with weak acids. The inorganic base acts as an acid acceptor to capture the hydrochloric acid that is formed as a byproduct of the curing reaction. Typical metals include, but are not limited to, those of Group IIA of the Periodic Table, such as Mg, Ca, or Ba. Specific examples of these compounds include, but are not limited to, magnesium oxide, magnesium hydroxide, calcium oxide, calcium hydroxide, barium hydroxide, magnesium carbonate, calcium carbonate, barium carbonate. Preferred basic metal oxides and hydroxides are magnesium oxide and magnesium hydroxide. The basic metal oxides are generally incorporated at levels of 2-10 parts per hundred parts (phr) of the chlorinated elastomer.

Polymercapto crosslinking agents, as used herein, refers to crosslinking agents, which contain at least two —SH groups. These crosslinking agents may sometimes be referred to as curing agents or vulcanizing agents. Specific examples of polymercapto crosslinking agents that may be employed in the compositions of this invention include, but are not limited to, 2,5-dimercapto-1,3,4-thiadiazole, and its derivatives as described in U.S. Pat. No. 4,128,510; 1,3,5-triazine-2,4,6-trithiol and its derivatives; dimercaptotriazoles as described in U.S. Pat. No. 4,234,705; 2-4-dithiohydantoins as described in U.S. Pat. No. 4,342,851; and 2,3-dimercapto-pyrazine or -quinoxalines as described in U.S. Pat. No. 4,357,446. Preferably, the crosslinking agent is 2-mercapto-1,3,4-thiadiazole-5-thiobenzoate. The polymercapto compound is typically incorporated at levels from 0.5 to 5 parts per hundred parts (phr) of the chlorinated elastomer.

Vulcanization accelerators useful in the compositions of this invention are quaternary ammonium or phosphonium (onium) salts having the general formula selected from the group consisting of

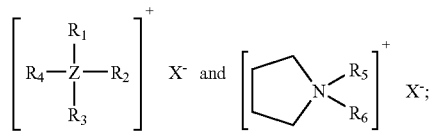

wherein Z is either a nitrogen atom or a phosphorous atom, each of $R_{1-4}$ is independently an alkyl or aryl group containing between 2 and 8 carbon atoms and wherein the total number of carbon atoms on $R_{1-4}$ is between 10 and 14 carbons, $R_5$ and $R_6$ are alkyl groups containing between 1 and 8 carbon atoms and the total number of carbon atoms on $R_5$-$R_6$ is between 5 and 9. Preferred aryl groups are benzyl or phenyl. The anion, $X^-$, of the onium salt may include, but is not limited to, chloride, bromide, hydrogen sulfate, acetate, fluoride, dihydrogen phosphate, and other anions, which form stable quaternary ammonium or phosphonium salts. Aromatic heterocyclic quaternary ammonium and phosphonium salts, wherein the nitrogen or phosphorous atom is part of the ring, are not considered accelerators for use in the compositions of this invention. Particularly useful quaternary ammonium compounds are tetrapropylammonium bromide and triethylhexylammonium bromide.

Compositions of the present invention may include other ingredients commonly employed in rubber vulcanization such as fillers, extenders, plasticizers, stabilizers, and pigments. The properties of the final vulcanizate can be adjusted by addition of these materials to suit the application. Examples of common fillers are calcium carbonate, carbon black, or clay. Extenders and plasticizers are usually aromatic or napthenic oils or esters. A typical pigment is titanium dioxide.

The curable compositions of this invention have a combination of good process safety (low scorch and good bin stability) and relatively fast and reproducible cure rates. Typically a scorch rate (see Test Methods) of less than 0.35 Mooney units (MU) per minute is considered safe. A cure rate (see Test Methods) of at least 3 in-lb per minute (3.4 dN·m/minute) is considered acceptable. The ratio of cure rate to scorch rate is a convenient parameter that may be employed to describe a cure system. For most processes, a ratio of at least 13 in-lb/MU (14.7 dN·m/MU) is acceptable.

Typical end use applications for the curable compositions of this invention include automotive and industrial hose, wire and cable jackets, vibration isolators, flexible boots for mechanical joints, roller covers, seals, and gaskets.

The ingredients of the curable chloroelastomer composition are typically mixed and uniformly blended with the chlorinated elastomeric polymer by use of a high intensity internal mixer such as a Banbury® (Farrel Corporation) mixer. They may also be incorporated by milling on a two roll mill or by any other mechanical mixing device from which a uniform blend of the ingredients can be derived. It is preferable to mix the ingredients of the elastomeric composition such that the temperature of the composition does not exceed about 110° C. and the time of the mixing is maintained as short as is necessary to achieve a uniform composition.

The mixing process may be improved by adding some of the ingredients in a binder. For example, reaction accelerators can be bound in a polymer such as ethylene-propylene-diene rubber at concentrations of 25-75 percent of the accelerator, thus making addition of small amounts of ingredient easier to handle. Whether the ingredients are added neat or in binders does not materially affect the results of this invention.

The conditions under which the elastomeric compound is crosslinked into the elastomeric product range from temperatures of from 130° C. to 200° C. and from atmospheric to high pressures, such as those encountered in compression or injection molding. The time for the crosslinking reaction to take place varies with the temperature and the concentrations of polymercapto compound, accelerator, and metal oxide in the composition. Lower temperatures and lower concentrations require longer times for the finished part to be crosslinked. Typical crosslinking times may be from 1 minute to several hours.

Test methods include the following:

Cure rate testing was accomplished according to ASTM D2084 on a Monsanto Oscillating Disk Rheometer (ODR) at 177° C. for 30 minutes.

Evaluation for processing safety was accomplished according to ASTM D1646 on a Monsanto MV2000E using changes in the Mooney viscosity over the course of a 25 minute test at 121° C.

For the ODR testing, ML and MH refer to the minimum and maximum torques measured during the test. The t2, t50, and t90 parameters are the time for the torque to change 2 percent, 50 percent, and 90 percent of the difference between MH and ML.

The maximum cure rate was obtained directly from the slope of the ODR curve by calculating the slope of the curve from point to point and taking the maximum value of the slope.

For the Mooney Scorch test used to estimate processing safety, Mooney Minimum refers to the minimum viscosity observed during the test. The parameters t3, t5, and t10 refer to the time for the Mooney Viscosity to rise by 3, 5, and 10 units respectively. A scorch rate can be calculated by dividing 2 by the difference between t5 and t3. However, if the Mooney viscosity fails to change more than 3-5 units during the test, a scorch rate can be calculated using the following Equation 1.

$$\text{Scorch Rate} = (\text{Mooney Viscosity@25 min} - \text{Mooney Minimum}) / (25 \text{ min} - \text{time@Mooney Minimum}) \quad \text{Equation 1}$$

EXAMPLES

The following examples illustrate the present invention but are not intended to limit the scope of the invention. The examples of the instant invention demonstrate that high vulcanization rates can be maintained while improving the processing safety of the compound by choosing the quaternary ammonium or phosphonium salt accelerator in accordance with the present invention.

Examples 1-4 and Comparative Examples A-J

Each of the compositions in Tables I and III was mixed using a Banbury® BR (Farrel Corporation) internal mixer. The dry ingredients were charged to the mixer first, followed by the liquid ingredients, and then the chlorinated elastomer. A slow mixing speed was used. The Banbury chute was swept down after the compound had fluxed, and was dumped from the mixer at 105° C. The compound discharged from the mixer was placed on a 15.24 cm×33.02 cm (6 inch×13 inch) two-roll mill and was rolled as it came off the mill. This mill procedure was repeated an additional 5-6 times to ensure adequate dispersion of all the ingredients. The final sheet was obtained from the mill in a thickness of approximately 3 mm. Samples cut from this final sheet were used to measure cure rates, and processing safety of the compositions. All quaternary ammonium salts were added such that 0.001 moles of the quaternary ammonium salt was used per 100 grams of the rubber used in the composition.

TABLE I

| Ingredient | Example 1, phr | Example 2, phr | Comp. Example A, phr | Comp. Example B, phr | Comp. Example C, phr | Comp. Example D, phr | Comp. Example E, phr | Comp. Example F, phr | Comp. Example G, phr |
|---|---|---|---|---|---|---|---|---|---|
| Chlorinated Polyethylene[1] | 100 | 100 | 100 | 100 | 100 | 100 | 100 | 100 | 100 |
| Carbon Black[2] | 50 | 50 | 50 | 50 | 50 | 50 | 50 | 50 | 50 |
| Magnesium Hydroxide[3] | 5 | 5 | 5 | 5 | 5 | 5 | 5 | 5 | 5 |
| Aromatic Oil[4] | 30 | 30 | 30 | 30 | 30 | 30 | 30 | 30 | 30 |
| 2-mercapto-1,3,4-thiadiazole-5-thiobenzoate[5] | 2.67 | 2.67 | 2.67 | 2.67 | 2.67 | 2.67 | 2.67 | 2.67 | 2.67 |
| Triethylhexylammonium bromide[6] | 0.27 | | | | | | | | |
| Tetrapropylammonium bromide[7] | | 0.27 | | | | | | | |
| Tetrabutylammonium bromide[8] | | | 0.66 | | | | | | |
| Tetrahexylammonium bromide[9] | | | | 0.45 | | | | | |
| Tetraheptylammonium bromide[10] | | | | | 0.5 | | | | |
| Tetraethylammonium bromide[11] | | | | | | 0.21 | | | |
| Octadecyltrimethylammonium bromide[12] | | | | | | | 0.4 | | |
| Methyltrioctylammonium bromide[13] | | | | | | | | 0.46 | |
| Didecyldimethylammonium bromide[14] | | | | | | | | | 0.42 |

[1]Tyrin® CM0836 available from DuPont Dow Elastomers L.L.C.

[2]N-774 available from Sid Richardson Carbon Co.

[3]StanMag® Hydroxide B available from Harwick

[4]Sundex® 790T available from Sunoco, Inc.

[5]Mastermix® MB 4842 (75 percent active) available from Harwick

[6-7,9-13]Available from Aldrich

[8]Mastermix® MB 4988 (50 percent active) available from Harwick

The cure rate and processing safety data of compositions containing quaternary ammonium bromides as accelerators, Examples 1 and 2, and Comparative Examples A-G are listed in Table II. The ratio of the maximum cure rate/scorch rate can be used to estimate the quality of the accelerator. Accelerators that give fast cure rates but good processing safety will have high ratios. From Table II, it can be clearly seen that the Examples of the present invention have the highest ratios of cure rate/scorch rate and are preferred accelerators.

TABLE II

| Property | Example 1 | Example 2 | Comparative Example A | Comparative Example B | Comparative Example C | Comparative Example D | Comparative Example E | Comparative Example F | Comparative Example G |
|---|---|---|---|---|---|---|---|---|---|
| ML min (in-lb) | 13.44 | 14.03 | 14.54 | 15.44 | 17.34 | 12.72 | 12.72 | 15.21 | 13.88 |
| MH max (in-lb) | 47.73 | 46.77 | 51.98 | 56.98 | 59.25 | 35.68 | 44.21 | 52.65 | 46.89 |
| t2 (minutes) | 1.3 | 1.28 | 1.03 | 0.89 | 0.86 | 2.19 | 1.88 | 1.03 | 1.37 |
| t50 (minutes) | 4.46 | 4.33 | 3.24 | 2.77 | 2.45 | 10.6 | 10.6 | 4.44 | 8.24 |
| t90 (minutes) | 12.51 | 13.06 | 8.74 | 7.51 | 7.34 | 21.11 | 21.15 | 16.47 | 19.88 |
| Max Cure Rate @177 C. (in-lb/min) | 6.14 | 6.11 | 9.56 | 11.42 | 14.50 | 1.37 | 1.85 | 7.03 | 3.40 |
| Mooney minimum, 121° C., MU | 35.4 | 36.2 | 37.8 | 38.6 | 42.6 | 35.5 | 35 | 39.2 | 36.4 |
| t3, min | 15.8 | 13 | 7.85 | 5.79 | 4.68 | | 18.9 | 6.62 | 9.17 |
| t5, min | | 20.3 | 10.18 | 7.02 | 5.7 | | | 8.14 | 12.08 |
| t10, min | | | 17.27 | 10.18 | 8.17 | | | 12.12 | 20.75 |
| Scorch Rate at 121° C., 2/(t5 − t3), MU/min | 0.258 (est.)* | 0.276 | 0.858 | 1.626 | 1.961 | 0.110(est.)* | 0.205(est.)* | 1.316 | 0.687 |
| Max Cure Rate at 177° C./Scorch Rate at 121 C. (in-lb/MU) | 23.8 | 22.15 | 11.14 | 7.02 | 7.40 | 12.45 | 9.02 | 5.34 | 4.95 |

*The scorch rate was estimated by the slope of the Mooney Scorch Curve since t5 > 25 minutes

TABLE III

| Ingredient | Example 3, phr | Example 4, phr | Comp. Example H, phr | Comp. Example I, phr | Comp. Example J, phr |
|---|---|---|---|---|---|
| Chlorinated Polyethylene[1] | 100 | 100 | 100 | 100 | 100 |
| Carbon Black[2] | 50 | 50 | 50 | 50 | 50 |
| Magnesium Hydroxide[3] | 5 | 5 | 5 | 5 | 5 |
| Aromatic Oil[4] | 30 | 30 | 30 | 30 | 30 |
| 2-mercapto-1,3,4-thiadiazole-5-thiobenzoate[5] | 2.67 | 2.67 | 2.67 | 2.67 | 2.67 |
| Tetrapropylammonium chloride[6] | 0.23 | | | | |
| Tetrapropylammonium iodide[7] | | 0.32 | | | |
| Tetraethylammonium iodide[8] | | | 0.26 | | |
| Tetrabutylatnmonium chloride[9] | | | | 0.28 | |
| Tetrabutylammonium iodide[10] | | | | | 0.38 |

[1]Tyrin ® CM 0836 available from DuPont Dow Elastomers L.L.C.
[2]N-774 available from Sid Richardson Co.
[3]StanMag ® Hydroxide B available from Harwick
[4]Sundex ® 790T available from Sunoco, Inc.
[5]Mastermix ® MB 4842 (75 percent active) Available from Harwick
[6-7,9-10]Available from Aldrich
[8]available from Harwick Additional examples were prepared using tetrapropylammonium chloride and iodide versus comparative examples containing tetraethylammonium iodide and tetrabutylammonium chloride and iodide. The composition of Examples 3 and 4, and that of Comparative Examples H, J, and I are listed in Table III. The cure rate and processing safety data for these compositions are listed in Table IV. The ratio of the maximum cure rate/scorch rate is clearly higher for the examples of the present invention.

TABLE IV

| Property | Example 3 | Example 4 | Comparative Example H | Comparative Example I | Comparative Example J |
|---|---|---|---|---|---|
| ML min (in-lb) | 14.73 | 11.87 | 11.02 | 16.53 | 15.2 |
| MH max (in-lb) | 48.57 | 43.35 | 26.89 | 53.93 | 51.55 |
| t2 (minutes) | 1.13 | 1.84 | 2.72 | 0.93 | 1.01 |
| t50 (minutes) | 3.88 | 7.38 | 14.18 | 2.77 | 3.15 |
| t90 (minutes) | 12.58 | 19.92 | 26.39 | 7.89 | 8.5 |
| Max Cure Rate @177° C. (in-lb/min) | 6.96 | 3.07 | 0.66 | 10.89 | 6.43 |
| Mooney minimum, 121° C., MU | 36.7 | 34.3 | 33.8 | 39.8 | 37.2 |
| t3, min | 11.4 | 19.9 | | 5.95 | 7.55 |
| t5, min | 17.13 | | | 7.45 | 9.73 |
| t10, min | | | | 11.78 | 15.47 |
| Scorch Rate at 121° C., 2/(t5 − t3), MU/min | 0.347 | 0.23(est.)* | 0.093(EST.)* | 1.33 | 0.917 |
| Max Cure Rate at 177° C./Scorch Rate at 121° C. (in-lb/MU) | 20.04 | 13.35 | 7.10 | 8.17 | 7.01 |

*The scorch rate was estimated by the slope of the Mooney Scorch Curve since t5 > 25 minutes.

Examples 5-8

Compositions of the invention containing pyrollidinium chlorides or bromides as cure accelerators were made by the same process that was employed to prepare Examples 1-4 above. The formulations are shown in Table V. Cure rate and processing safety parameters are given in Table VI.

TABLE V

| Ingredient | Example 5, phr | Example 6, phr | Example 7, phr | Example 8, phr |
|---|---|---|---|---|
| Chlorinated Polyethylene[1] | 100 | 100 | 100 | 100 |
| Carbon Black[2] | 50 | 50 | 50 | 50 |
| Magnesium Hydroxide[3] | 5 | 5 | 5 | 5 |
| Aromatic Oil[4] | 30 | 30 | 30 | 30 |
| 2-mercapto-1,3,4-thiadiazole-5-thiobenzoate[5] | 2.67 | 2.67 | 2.67 | 2.67 |
| 1-butyl-1-methylpyrollidinium bromide[6] | 0.23 | | | |
| 1-butyl-1-methylpyrollidinium chloride[7] | | 0.19 | | |
| 1-hexyl-1-methylpyrollidinium chloride[8] | | | 0.22 | |
| 1-octyl-1-methylpyrollidinium chloride[9] | | | | 0.25 |

[1]Tyrin ® CM 0836 available from DuPont Dow Elastomers L.L.C.
[2]N-774 available from Sid Richardson Co.
[3]StanMag ® Hydroxide B available from Harwick
[4]Sundex ® 790T available from Sunoco, Inc.
[5]Mastermix ® MB 4842 (75 percent active) available from Harwick
[6-9]Available from Aldrich

TABLE VI

| Test Parameter | Example 5 | Example 6 | Example 7 | Example 8 |
|---|---|---|---|---|
| ML min (in-lb) | 12.06 | 12.49 | 12.72 | 13.75 |
| MH max (in-lb) | 42.08 | 44.34 | 45.95 | 48.93 |
| t2 (minutes) | 2.29 | 1.99 | 1.71 | 1.45 |
| t50 (minutes) | 9.73 | 8.6 | 7.34 | 6.33 |
| t90 (minutes) | 21.01 | 19.77 | 18.28 | 16.75 |
| Max Cure Rate @177° C. (in-lb/min) | 2.5 | 2.64 | 3.17 | 3.87 |
| Mooney minimum, 121° C., MU | 33.9 | 34.5 | 34.4 | |
| t3, min | | | 19.22 | 14.4 |
| t5, min | | | | 21.15 |
| t10, min | | | | |

TABLE VI-continued

| Test Parameter | Example 5 | Example 6 | Example 7 | Example 8 |
|---|---|---|---|---|
| Scorch Rate at 121° C., 2/(t5 − t3), MU/min | 0.111* | 0.108* | 0.166* | 0.269* |
| Max Cure Rate at 177° C./ Scorch Rate at 121° C. (in-lb/MU) | 22.5 | 24.5 | 19.1 | 14.4 |

We claim:

1. A cure system composition comprising:
   a polymercapto crosslinking agent selected from the group consisting of 2,5-dimercapto-1,3,4-thiadiazole, and a derivative thereof;
   an inorganic base; and
   an onium salt selected from the group consisting of tetrapropylammonium bromide, and triethylhexylammonium bromide.

2. A curable chlorinated elastomer composition comprising:
   a chlorinated elastomer;
   a polymercapto crosslinking agent selected from the group consisting of 2,5-dimercapto-1,3,4-thiadiazole, and a derivative thereof;
   an inorganic base; and
   an onium salt selected from the group consisting of tetrapropylammonium bromide, and triethylhexylammonium bromide.

3. The curable chlorinated elastomer composition according to claim 2, wherein said chlorinated elastomer is selected from the group consisting of polychloroprene, polyepichlorohydrin, epichlorohydrin/ethylene oxide copolymers, chlorosulfonated polyethylene, chlorinated polyethylene, and chlorinated butyl rubbers.

4. The curable chlorinated elastomer composition according to claim 3, wherein said chlorinated elastomer is chlorinated polyethylene.

5. A method of curing a chlorinated elastomer composition comprising the steps of:
   providing a chlorinated elastomer composition;
   providing a cure system composition comprising:
      a polymercapto crosslinking agent;
      an inorganic base; and
      an onium salt selected from the group consisting of tetrapropylammonium bromide, and triethylhexylammonium bromide;
   contacting said chlorinated elastomer composition with said cure system composition; and
   thereby curing said chlorinated elastomer composition.

6. The method of curing a chlorinated elastomer composition according to claim 5, wherein said chlorinated elastomer composition and said cure system composition are admixed.

7. The method of curing a chlorinated elastomer composition according to claim 5, wherein said contacting step is conducted at a temperature in the range of 130° C. to 200° C.

8. The method of curing a chlorinated elastomer composition according to claim 5, wherein said chlorinated elastomer is selected from the group consisting of polychloroprene, polyepichlorohydrin, epichlorohydrin/ethylene oxide copolymers, chlorosulfonated polyethylene, chlorinated polyethylene, and chlorinated butyl rubbers.

9. The method of curing a chlorinated elastomer composition according to claim 8, wherein said chlorinated elastomer is chlorinated polyethylene.

* * * * *